Patented Apr. 13, 1926.

1,580,906

UNITED STATES PATENT OFFICE.

FRIEDRICH KÖRBER, OF DUSSELDORF, AND WILHELM HESSEL, OF ESSEN-RUHR, GERMANY.

PROCESS FOR THE PRODUCTION OF ARTIFICIAL STONE, STONEWARE, AND THE LIKE FROM BOILER SLAG, DUST SLAG, OR ASHES.

No Drawing.   Application filed June 7, 1924.   Serial No. 718,672.

*To all whom it may concern:*

Be it known that we, FRIEDRICH KÖRBER and WILHELM HESSEL, citizens of the German State, residing, respectively, at 14 Mendelsohnstrasse, Dusseldorf, Germany, and 47 Julienstrasse, Essen-Ruhr, Germany, have invented certain new and useful improvements in a process for the production of artificial stone, stoneware, and the like from boiler slag, dust slag, or ashes, of which the following is a specification.

It is known to produce stone ware of every description, such as building stone and other massive and hollow blocks for constructional purposes, also platform and pavement flags, pantiles, tubes, chimney stones, kneading troughs, insulators and the like from coal clinker (boiler slag, dust slag or ashes). Hitherto it has been customary to add to the clinker or slag a binder, such as lime, cement, clay or silicates in a finely divided form. The stone ware thus produced is of a colour that is little suited for outdoor building purposes and its degree of hardness is comparatively low.

Furthermore, stone ware produced by the known method often contains injurious constitutents which affect its quality very appreciably.

According to the invention the coal clinker after being reduced or ground is first moulded and then subjected to sintering. Thus the binder hitherto usually employed is entirely dispensed with. By regulating the degree of fineness to which the clinker or slag is ground and also the temperature of combustion, the sintering of the moulded body proceeds inwards uniformly and by reason of the particles being pointed and having constituents which scorify upon reaching the sintering temperature, a material of great strength and hardness is produced. In the case of fairly large pieces the operation of sintering can be assisted by providing recesses and grooves therein. By intermittently or otherwise increasing or reducing the thermal action the stone ware is given the desired qualities—glassy or rough surface, compactness, permeability, etc.

The sintering process can be influenced by retaining, instead of separating out, the part of the unburnt fuel residues contained in the clinker or slag. The combustible constituents retained are burnt by suitably carrying out the sintering process; the heat generated assisting the sintering action.

In carrying the invention into effect the clinker or slag is reduced or ground and separated from the unburnt residues either completely or to a determined extent, and then, after being slightly moistened, is placed in a mould of suitable form for producing the stone article desired, and pressure then applied. The bodies formed are then subjected to the sintering process in a furnace, for example, a tunnel furnace, under the conditions of temperature above referred to, that is with intermittent increase, reduction or interruption of the thermal action. After cooling, the stone ware thus produced is at once ready for use.

According to the invention light porous stone ware, similar to pumice-stone, can be produced in known manner by the addition of combustible substances, such as sawdust, cork-waste, short-straw, peat, and the like.

Moreover the stone ware may be provided with a coating by means of a spraying device, such coating adhering firmly to the surface.

The stone ware produced by this new process is distinguished by great strength and hardness, sharp edges, insensibility to weather conditions, most exact retention of the original size and shape, and also by uniformity of colour.

The technical and industrial progress involved in this invention is clear from the foregoing. The utility of the process is enhanced by the fact that the fuel residues previously separated out from the clinker or slag can be directly used for supplying the necessary heat for sintering, for example, by firing with powdered coal. The waste heat of the sintered products and of the waste products carried away to be cooled may be used for generating power. In this way the present invention effects a saving in fuel, which in the known processes is required for the production of the cement, lime, or other binder hereinbefore referred to, and it also meets the demand for the complete utilization of the waste products which have heretofore been looked upon as valueless or of little value. The great quantities of clinker or slag, available in various industries can thus be economically utilized.

We claim:

A process for producing stoneware from substances of the character of coal clinker such as slags comprising the reduction of the clinker or slag to a finely divided condition, moulding the finely divided clinker or slag into the form of the object to be produced and then sintering the moulded body, substantially as described.

FRIEDRICH KÖRBER.
WILHELM HESSEL.